(12) United States Patent
Lee et al.

(10) Patent No.: US 11,807,054 B2
(45) Date of Patent: Nov. 7, 2023

(54) POLYESTER TIRE CORD AND RADIAL TIRE USING SAME

(71) Applicant: HYOSUNG ADVANCED MATERIALS CORPORATION, Seoul (KR)

(72) Inventors: Kyoung Ha Lee, Anyang (KR); Cheol Kim, Seongnam (KR); Jin Kyung Park, Yongin (KR)

(*) Notice: Subject to any disclaimer, the term of this patent is extended or adjusted under 35 U.S.C. 154(b) by 371 days.

(21) Appl. No.: 16/758,879

(22) PCT Filed: Oct. 2, 2018

(86) PCT No.: PCT/KR2018/011693
§ 371 (c)(1),
(2) Date: Apr. 24, 2020

(87) PCT Pub. No.: WO2019/088464
PCT Pub. Date: May 9, 2019

(65) Prior Publication Data
US 2020/0369086 A1 Nov. 26, 2020

(30) Foreign Application Priority Data
Nov. 1, 2017 (KR) .................. 10-2017-0144469

(51) Int. Cl.
*B60C 9/00* (2006.01)
*C08G 63/183* (2006.01)
(Continued)

(52) U.S. Cl.
CPC .......... *B60C 9/0042* (2013.01); *C08G 63/183* (2013.01); *C08L 67/02* (2013.01);
(Continued)

(58) Field of Classification Search
CPC ........... D02G 3/48; D01F 6/62; B60C 9/0042; B60C 2009/0085; C08G 63/183; C08L 67/02; D07B 2205/2039; D07B 2501/2046
See application file for complete search history.

(56) References Cited

U.S. PATENT DOCUMENTS

2003/0207111 A1* 11/2003 Nelson ..................... D01D 5/12
428/395
2005/0147814 A1* 7/2005 Middeljans ............ D01D 5/088
264/211.14
(Continued)

FOREIGN PATENT DOCUMENTS

CN 101680134 A 3/2010
CN 101981240 A 2/2011
(Continued)

OTHER PUBLICATIONS

International Search Report for PCT/KR2018/011693 dated Feb. 1, 2019.

*Primary Examiner* — Patrick J. Lynch

(57) ABSTRACT

Disclosed is a radial tire having a cap ply manufactured with a polyethylene terephthalate dip cord. The radial tire includes: a pair of parallel bead cores; at least one radial carcass ply wound around the bead cores; one or more inclined belt layers layered on the outer circumference of the carcass ply; and one or more cap ply layers layered in the circumferential direction of a tire on the outer circumference of the inclined belt layers, wherein the cap ply includes a dip cord manufactured using a yarn comprising 90 mol % or more of polyethylene terephthalate, and the dip cord has a shrinkage of 3.0-4.0%, a strength of 2.5-3.0 g/d at an elongation of 5%, a breaking strength of 6.5-7.5 g/d, and a dimensional stability index of 5.8-6.5.

3 Claims, 3 Drawing Sheets

(51) Int. Cl.
 *C08L 67/02* (2006.01)
 *D02G 3/48* (2006.01)
 *D07B 1/02* (2006.01)
(52) U.S. Cl.
 CPC ............... *D02G 3/48* (2013.01); *D07B 1/02* (2013.01); *B60C 2009/0085* (2013.01); *D07B 2205/2039* (2013.01); *D07B 2501/2046* (2013.01)

(56) References Cited

U.S. PATENT DOCUMENTS

| | | | | |
|---|---|---|---|---|
| 2007/0251623 | A1* | 11/2007 | Han | B60C 9/0042 57/200 |
| 2011/0024016 | A1* | 2/2011 | Chung | D01F 6/62 528/308.1 |
| 2013/0302610 | A1* | 11/2013 | Park | D01D 5/12 428/401 |
| 2019/0184750 | A1* | 6/2019 | Sasaki | D06M 13/127 |
| 2020/0369086 | A1* | 11/2020 | Lee | C08G 63/183 |

FOREIGN PATENT DOCUMENTS

| | | | |
|---|---|---|---|
| CN | 104160075 A | 11/2014 | |
| KR | 2008-0112160 A | 12/2008 | |
| KR | 2009-0104748 A | 10/2009 | |
| KR | 2012-0001939 A | 1/2012 | |
| KR | 2012-0072860 A | 7/2012 | |
| KR | 2015-0055119 A | 5/2015 | |
| WO | WO-2008156333 A1 * | 12/2008 | B29C 48/05 |

* cited by examiner

POLYESTER TIRE CORD AND RADIAL TIRE USING SAME

CROSS REFERENCE TO RELATED APPLICATIONS

This application claims priority to Korean Patent Application No. 10-2017-0144469, filed on Nov. 1, 2017. Further, the application is the National Phase application of International Application No. PCT/KR2018/011693, filed on Oct. 2, 2018, which designates the United States. Each of these applications is hereby incorporated by reference in their entirety into the present application.

Technical Field

The present invention relates to a radial tire with a cap ply made of polyethylene terephthalate dip cord.

BACKGROUND ART

In recent years, tire performance has been continuously improved in accordance with improvements in the road environment and vehicle performance. In particular, safety has been recognized as an important quality factor of tires as vehicle weight increases and limit speed increases. The safety standards of tires are also being changed in accordance with the increasing demand for safety of tires. Researches on methods for imparting safety of tires are also being actively conducted in the tire industry.

The installation of a cap ply on a passenger car tire is for the safety of the tire, and recently, a tire having such a cap ply has been generalized. The cap ply is continuously wound without breaking in the circumferential direction of the tire between the tire tread portion and the steel cord layer for belt reinforcement, thereby maintaining the shape stability of the tire, and improves the tire's high-speed durability by suppressing tire growth and deformation due to centrifugal force during high-speed driving. When the vehicle is traveling at a high speed, the air pressure of the tire increases as the temperature inside the tire increases, with the increase of the centrifugal force due to the rotation of the tire, and a load is applied in the longitudinal direction of the cap ply cord. In this way, when driving at high speed, the tire will increase in size due to centrifugal force, temperature rise, and air pressure, and as the load decreases on the ground surface that repeatedly comes into contact with the road surface as the vehicle travels, and then the load recovers on the non-ground surface repeatedly, the amount of deformation applied to the cord and tire increases, and in proportion to the increase in the amount of deformation, the work loss of the tire cord itself increases. This work loss again contributes to the temperature rise of the tire and the tire cord, resulting in a sudden rise in temperature and deterioration of durability of the tire.

The cap fly cord serves to prevent the increase in the size of the center and tread of the tire due to centrifugal force when driving the vehicle, thereby reducing the amount of deformation of the tire, reduces work loss according thereto and prevents tire temperature from increasing, and improves tire durability. In general, a material that is not deformed due to its high elastic modulus, or when the temperature rises, the heat shrinkage force is expressed and the cap fly cord contracts, so that a material that can prevent the size increase during driving of the tire is used. In this case, since the size of the tire is not increased, an increase in tire rotational inertia is prevented, resulting in an increase in fatigue life and an increase in durability by reducing heat consumption and suppressing heat generation of the tire.

In general, the most widely used material for cap ply material is nylon 66. This is due to the high shrinkage of nylon 66, and particularly, the part where the cap ply is reinforced is known to have the highest temperature during driving on the tire. Nylon 66 having this property is widely used as a cap ply material because a material having heat resistance in addition to the heat shrining force should be used and a material having a small decrease in adhesion due to heat should be used. Other materials that can be used as the material of the cap ply are aramid. Aramid has different characteristics from nylon 66. The aramid fiber is an aromatic polyamide fiber and is a polyamide fiber having a benzene ring in a repeating unit. When it is applied to tire cap ply as a material that shows stable properties even at high temperatures, it is difficult to expect the contraction force to develop at high temperature, but since there is very little deterioration in properties even at high temperatures, deformation is suppressed, thereby showing characteristics similar to the result of applying the nylon cap ply. Therefore, although the use of such aramid fibers is increasing, there is a problem in that aramid fibers have low fatigue resistance, and at the same time, a cost problem occurs because the price is very high.

Research is also underway to apply to cap plies using materials such as PET, but since these materials are vulnerable to heat, it has been difficult to apply as a cap fly material. The present invention is proposed to apply a PET material, which was difficult to apply as a cap fly material, to a cap fly for a radial lire by limiting the properties of the PET cord.

DISCLOSURE

Technical Problem

An object of the present invention for solving the above problems is to provide a radial tire having a cap ply layer having a dip cord made of polyethylene terephthalate yarn applied thereto.

In the case of the polyethylene terephthalate cap ply according to the present invention, polyethylene terephthalate fiber has a low elongation at specific load, has a high shrinkage rate, and has improved strength and elastic modulus.

Technical Solution

According to an appropriate embodiment of the present invention, there is provided a radial tire including: a pair of parallel bead cores; at least one radial carcass ply which is wound around the bead core; at least one inclined belt layer laminated on an outer circumference of carcass ply; and at least one cap ply layer laminated on an outer circumference of the inclined belt layer in a tire circumferential direction, wherein the cap ply includes a dip cord manufactured using a 400 to 2200 denier yarn containing 90 mol % or more of polyethylene terephthalate in the form of 1 or more plys, and the dip cord has a shrinkage rate of 3.0 to 4.0%, a strength of 2.5 to 3.0 g/d when stretched by 5%, a breaking strength of 6.5 to 7.5 g/d, and a shape stability index of 5.8 to 6.5.

According to another suitable embodiment of the present invention, the dip cord is characterized in that it has an intermediate elongation of 2.1 to 4.0% at 2.25 g/d and an elongation at break of 8.0 to 16.0%.

According to another suitable embodiment of the present invention, the dip cord is characterized in that the twist coefficient represented by the number of twists (Twist/meter) multiplied by the square root of Nominal Denier is 9,000 to 18,000.

According to another appropriate embodiment of the present invention, the cap ply layer is generally reinforced with one or two layers, and if necessary, it is reinforced throughout the tread, selectively reinforced only on the tread edge, or reinforced in two layers on the tread, and additionally reinforced on the tread edge portion. Likewise, it is possible to apply similarly to the conventional cap ply cord reinforcement type, and is not limited by a special cap ply application structure.

According to another suitable embodiment of the present invention, a tire for a passenger car including the cap ply is provided, and, like a general cap ply, the application is not limited by lire types such as run flat tires, general passenger car tires, and light truck tires.

Advantageous Effects

Dip cords made of high strength yarns of polyethylene terephthalate of the present invention can overcome the disadvantage of low adhesive force with conventional rubber, and the cords formed from this yarn has excellent adhesive force and strength and can be usefully used as a reinforcing material for rubber products such as tires and belts or other industrial uses.

According to the present invention, satisfactory results for high-speed durability and the like of the tire can be obtained by applying a polyethylene terephthalate dip cord having specific properties in the present invention, to a cap ply layer of a radial tire for a passenger car.

DETAILED DESCRIPTION OF THE PREFERRED EMBODIMENTS

Figure 1:
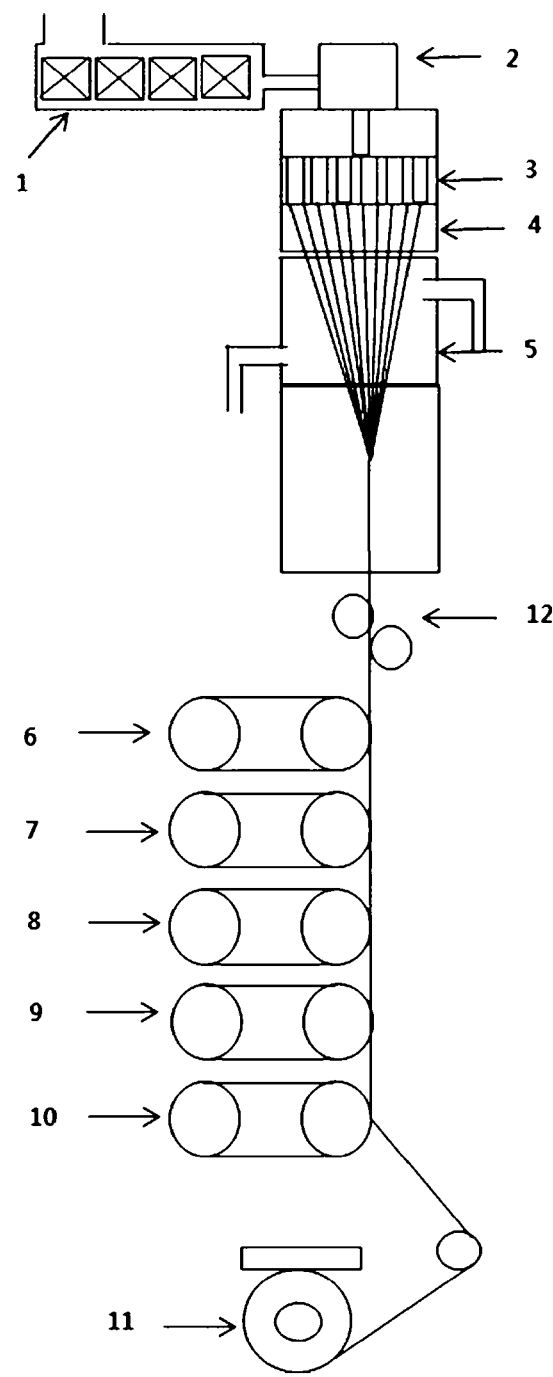
FIG. 1 shows a spinning and stretching process of polyethylene terephthalate yarn according to the present invention.

Hereinafter, preferred embodiments according to the present invention will be described in detail. The embodiment described herein does not limit the scope of the present invention, but is merely an example, and various modifications can be made without departing from the technical idea of the present invention.

The cap fly cord for the radial tire according to the present invention is manufactured through the following process. Polyethylene terephthalate multifilament is manufactured as a preliminary step for manufacturing a cord for a cap ply layer. First, a polyethylene terephthalate chip having an intrinsic viscosity of 0.9 to 1.20 is melted and extruded while passing through a nozzle to prepare a discharged yarn.

Here, the polyethylene terephthalate polymer may contain at least 85 mol % of ethylene terephthalate units, but may optionally include only ethylene terephthalate units.

Optionally, the polyethylene terephthalate may include a small amount of units derived from ethylene glycol and terephthalenedicarboxylic acid or derivatives thereof and one or more ester-forming components as copolymer units. Examples of other ester-forming components copolymerizable with polyethylene terephthalate units include glycols such as 1,3-propanediol, 1,4-butanediol, 1,6-hexanediol, and the like, and dicarboxylic acids such as terephthalic acid, isophthalic acid, hexahydroterephthalic acid, stilbendicarboxylic acid, bibenzoic acid, adipic acid, sebacic acid, and azclaic acid.

Terephthalic acid (TPA) and ethylene glycol raw materials were melt-mixed at a ratio of 2.0 to 2.3 on the prepared polyethylene terephthalate chip, and the melt mixture is transesterified and condensed-polymerized to form a raw chip. Thereafter, the raw chip is subjected to solid phase polymerization to have an intrinsic viscosity of 0.9 to 1.20 under a temperature of 240 to 260° C. and vacuum.

At this time, when the intrinsic viscosity of the raw chip is less than 0.9, the intrinsic viscosity of the final stretched yarn is lowered, so that it cannot exhibit high strength as a treatment cord after heat treatment, and when the intrinsic viscosity of the chip exceeds 1.20, the spinning tension increases excessively and the cross-section of the discharged yarn becomes uneven, resulting in a large number of filament cuts during stretching, resulting in poor stretching workability.

Also, an antimony compound, preferably antimony trioxide, may be optionally added as a polymerization catalyst during the condensation polymerization reaction so that the amount of the antimony metal remaining in the final polymer may become 180 to 300 ppm. When the residual amount is less than 180 ppm, the polymerization reaction rate becomes slow, and the polymerization efficiency decreases. When the residual amount exceeds 300 ppm, antimony metal more than necessary acts as a foreign material, so that the elongation workability may be deteriorated.

The above-mentioned polyethylene terephthalate chip is melted and extruded while passing through a nozzle to manufacture a discharged yarn. At this time, the diameter of the nozzle is preferably 0.8 to 1.4 mm.

Thereafter, the discharged yarn is rapidly cooled and solidified by passing through the cooling zone. At this time, if necessary, a heating device of a certain length is installed in the section from the nozzle directly to the starting point of the cooling zone, that is, in the length (L) section of the hood.

This zone is called a delayed cooling zone or a heating zone, which has a length of 50 to 300 mm and a temperature of 250 to 400° C. (air contact surface temperature).

In the cooling zone, open quenching, circular closed quenching, radial outflow quenching, and radial inflow quenching, etc. may be applied, depending on how the cooling air is blown, but are not limited thereto.

At this time, the temperature of the cooling air injected for rapid cooling in the cooling zone is adjusted to 20 to 50° C. The rapid cooling using a rapid temperature difference between the hood and the cooling zone is intended to increase the solidification point and spinning tension of the spun polymer to increase the orientation of unstretched yarns and the formation of a linking chain between crystals and crystals.

Subsequently, the friction coefficient between the single yarns and the solidified, discharged yarns is reduced while passing through the cooling zone. At the same time, the discharged yarn can be oiled at 0.5 to 1.2% by weight by the first spinning emulsion supply device to which an emulsion having excellent stretchability and thermal efficiency is applied. Emulsion type used for oil ring can be applied as emulsion type, solvent type, or neat oil type, and the type of emulsion does not limit the properties of the polyethylene terephthalate yarn applied to the present invention.

It is preferable to form the unstretched yarn by spinning the oiled discharged yarn, and the orientation degree of the unstretched yarn is preferably 0.06 to 0.60. If the orientation degree of the unstretched yarn is less than 0.06, the crystallinity and the density of the crystal cannot be increased in the microstructure of the yarn, and if it exceeds 0.60, the stretching workability is lowered, which is not preferable. Thereafter, the unstretched yarn is passed through a drawing Godet roller to be multi-stretched at an appropriate drawing ratio to prepare a yarn.

In the present invention, the stretching is performed using an equipment to which the stretch Godet roller is applied in 5 stages.

Referring to FIG. 1, the PET chip is melt-spinned at a low temperature of 290 to 310° C. through an extruder 1, a gear pump 2, a nozzle 3, and a heating device 4 to thereby prevent a decrease in the viscosity of the polymer due to thermal decomposition and hydrolysis. The manufactured melt discharged yarn is rapidly cooled and solidified by passing through the cooling zone 5 and if necessary, a short heating device may be installed in the distance to the starting point of the cooling zone 5 immediately below the nozzle 3, that is, in the length L section of the hood.

The length (L) section of the hood becomes a delayed cooling zone or a heating zone, and has a length of 50 to 300 mm and a temperature of 250 to 400° C. (air contact surface temperature). Depending on how the cooling air is blown from the cooling zone 5, open quenching, circular closed quenching, and radial outflow quenching may be applied, but are not limited to this. The present invention is characterized in that it is further controlled by A/C (air conditioner) from the outside to lower the cooling temperature from 20° C. to 10-15° C. to improve cooling efficiency. The discharged yarn which has passed through the cooling zone 5 and solidified is oiled to 0.5 to 1.0% by the emulsion supply device 12 and becomes unstretched. The emulsion supply device 12 is characterized in that it is installed in one stage before the stretch Godet roller 1(6).

The yarn that has passed through the first drawing Godet roller is stretched while passing through a series of drawing rollers by a spin draw method to form a yarn. In the drawing Godet roller 1, the speed is set to be in the range of 2,000 to 3,500 m/min. In the stretching process, the undrawn yarn may be stretched in multiple stages, and the temperature of each drawing roller may be lower than or equal to the glass transition temperature of the undrawn yarn, but the temperature is lower than 95° C., and the final drawing roller 4(9) temperature is preferably 200 to 250° C.

If the temperature of the last drawing roller is less than 200° C., crystallinity and crystal size cannot be increased in the drawing process, so that the strength and thermal stability of the yarn cannot be expressed, resulting in a decrease in morphological stability at high temperatures. If the temperature of the last drawing roller exceeds 250° C., there is a problem in that the microstructure of the yarn becomes non-uniform such that crystals are decomposed because it is too close to the melting point, so that the strength of the yarn may be lowered.

In the present invention, in the drawing Godet roller 1, the speed is set in the range of 2,000 to 3,500 m/min. Thereafter, it is wound at 5000 to 6000 m/min on the drawn Godet roller 4, and the temperature in the drawing Godet roller 4 is 200 to 250° C.

In addition, the total stretch ratio of the yarn formed by winding as described above is preferably between 1.8 and 2.5. When the stretch ratio is less than 1.8, the orientation degree of the amorphous portion is insufficient, and a high-strength yarn cannot be obtained. As a result, the strength of the cap fly cord is low, resulting in a decrease in the high-speed durability of the tire. If the stretch ratio is 2.5 or more, the orientation degree is too high, and high strength of the cord can be achieved, but due to the high shrinkage rate, the tire manufacturing processability is insufficient, resulting in a tire with low uniformity and low heat resistance.

In order to manufacture the radial tire according to the present invention, a deep cord should be manufactured using the polyethylene terephthalate high strength multifilament yarn. In addition, it is necessary to give the cord a twist (twisting process) as a step before manufacturing the dip cord.

In the present invention, in the production of a dip cord using the polyethylene terephthalate high-strength yarn, as a preliminary step of the production of the dip cord, twisting is applied to the cord to produce a raw cord (twisting process).

The twisted yarn is manufactured by applying a ply twist to a polyethylene terephthalate yarn and then applying a cable twist thereto and twisted together, and in general, the same or different twist levels are used for the ply twist and the cable twist. The number of twists of the dip cord depends on the thickness of the yarn used for the cord and the overall denier. In the present invention, the twist coefficient indicated as [(twist/meter) multiplied by the square root of nominal Denier] may be 9,000 to 18,000. Polyester carcass used in the carcass of tires commonly has a twist coefficient of 19,000 to 21,000. In the present invention, by limiting the twist coefficient to the above range, it is possible to show an improved numerical value of the elastic modulus of the cord than the polyester cord for carcass.

In the present invention, when the twist coefficient of the polyethylene terephthalate cord is less than 9,000, the elongation at break is excessively reduced, thereby reducing the fatigue resistance of the cord itself, thereby reducing tire durability. When it exceeds 18,000, the strength decreases and the modulus of elasticity of the cord decreases, resulting in a decrease in high-speed durability of the tire due to an increase in heat generation due to an increase in tire growth, which may make it difficult to achieve improvement of the high-speed durability of the tire, which is the object of the invention.

The manufactured raw cord is woven into a fabric using a weaving machine, and the obtained fabric is immersed in a dipping solution, and heat-treated at an appropriate temperature and time to cure the adhesive solution on the surface of the fabric to prepare a dip cord for a tire cord with a resin layer attached to the surface of the cord. In the above process, the dipping solution is a 1 bath solution that activates the polyethylene terephthalate fiber surface and a 2 bath solution for introducing a resin layer called RFL (Resorcinol Formaline Latex), and refers to the adhesive liquid applied to the surface of the fiber to introduce the adhesive force between rubber and fiber.

In the present invention, an adhesive liquid for bonding a cord and rubber can be manufactured by the following method.

Manufacturing Method of 1 Bath Adhesive

| Distilled water | 950 parts by weight; |
|---|---|
| 100% epoxy | 5 parts by weight; |
| 50% isocyanate | 30 parts by weight |

A solution containing the above elements is prepared and is then stirred at 25° C. for 3 hours.

Manufacturing Method of 2 Bath Adhesive

| 29.4 wt % Resocinol | 45.6 parts by weight; |
|---|---|
| Distilled water | 255.5 parts by weight; |
| 37% formalin | 20 parts by weight; and |
| 10 wt % sodium hydroxide | 3.8 parts by weight |

A solution containing the above elements is prepared and is then reacted with stirring at 25° C. for 2 hours to prepare an RF resin condensate and then add the following components.

| 40 wt % VP-latex | 300 parts by weight; |
|---|---|
| Distilled water | 129 parts by weight; |
| 28% ammonia water | 23.8 parts by weight |

After the ingredients are added, it is aged for 20 hours at 25° C. and maintained at a solid content concentration of 19.05%, and the adhesive adhesion amount is preferably 1.5 to 3.5% of the fiber weight based on the solids.

After passing the 1-bath and 2-bath adhesive solution, the dip cord is dried and heat treated. After passing through the 1-bath adhesive solution, the hybrid dip cords are dried at 120-170° C. The drying time may be 130 to 220 seconds, and in the drying process, the dip cord may be stretched to about 2 to 6%. If the elongation ratio is low, elongation at specific load and the elongation at break of the cords may increase to thereby show properties which is difficult to be applied as the tire cord. On the other hand, if the elongation ratio is more than 6%, the level of the elongation at specific load is adequate but the elongation at break may be too small to thereby decrease the fatigue resistance.

After drying, heat treatment is performed at a temperature range of 200 to 245° C. The elongation ratio during the heat treatment is maintained between 0.0 and 6.0%, and the heat treatment time is suitably between 50 and 90 seconds. If the heat treatment is performed for less than 50 seconds, the reaction time of the adhesive solution is insufficient and the adhesive force is lowered. If the heat treatment is performed for more than 90 seconds, the hardness of the adhesive solution becomes high and the fatigue resistance of the cord may be decreased.

After passing through the 2-bath adhesive solution, the hybrid dip cords are dried at 120-170° C. The drying time may be 80 to 150 seconds, and in the drying process, the dip cord may be stretched to about 0 to 4%. If the elongation ratio is low, elongation at specific load and the elongation at break of the cords may increase to thereby show properties which is difficult to be applied as the tire cord. On the other hand, if the elongation ratio is more than 4%, the level of the elongation at specific load is adequate but the elongation at break may be too small to thereby decrease the fatigue resistance.

After drying, heat treatment is performed at a temperature range of 200 to 245° C. The elongation ratio during the heat treatment is maintained between −3 and 3.0%, and the heat treatment time is suitably between 50 and 120 seconds. If the heat treatment is performed for less than 50 seconds, the reaction time of the adhesive solution is insufficient and the adhesive force is lowered. If the heat treatment is performed for more than 120 seconds, the hardness of the adhesive solution becomes high and the fatigue resistance of the cord may be decreased.

Figure 2:
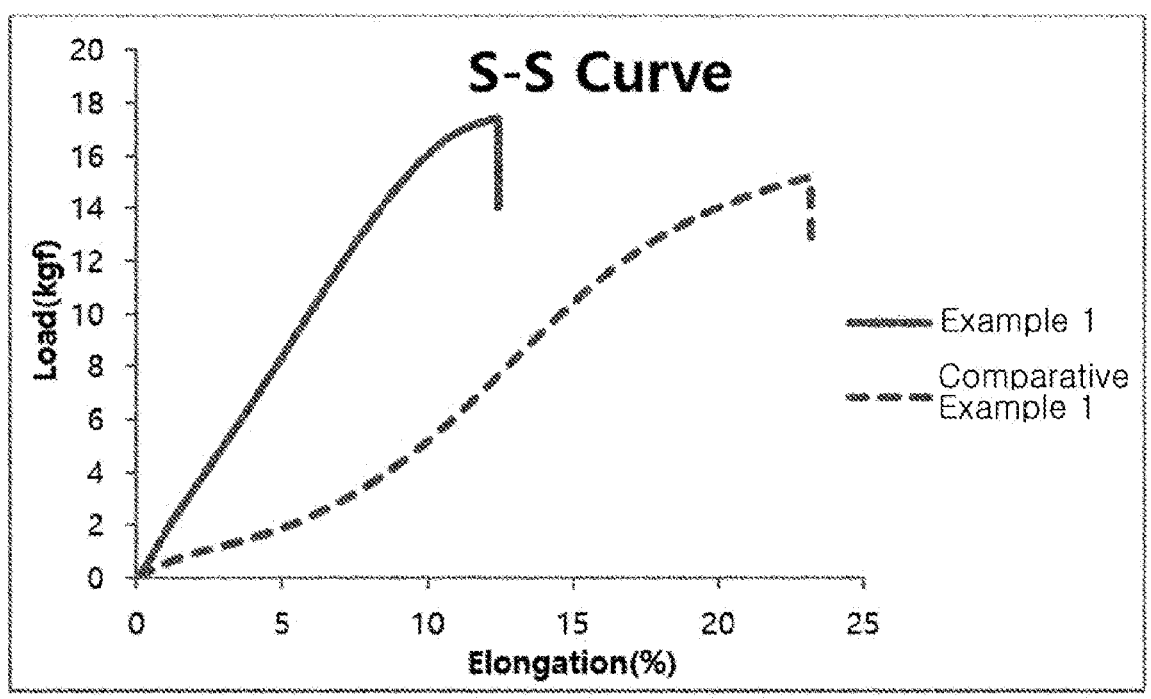
FIG. 2 shows a force-deformation curve for the present invention and a conventional 1000 d/2 polyethylene terephthalate dip cord.

FIG. 2 shows a force-deformation curve for the present invention and a conventional 1000 d/2 polyethylene terephthalate dip cord.

According to the present invention, the stress-strain curve of the polyethylene terephthalate dip cord for minimizing the initial deformation to the impact initially generated by the external force of the polyethylene terephthalate dip cord can be adjusted. The polyethylene terephthalate dip cord of the present invention is characterized by having a strength of 2.5 to 3.0 g/d, a breaking strength of 6.5 to 7.5 g/d, and a shape stability index of 5.8 to 6.5 when the shrinkage rate is 3.0 to 4.0% and stretched by 5%.

The shrinkage rate is evaluated by applying a 0.01 g/d superload using a normal Testrite and measuring at 177 degrees for 2 minutes, and the strength at 5% elastic modulus is obtained by reading the load of the point with 5% deformation rate on the S-S curve in g units and dividing by nominal Denier (Yarn Denier for 1 ply, and product of yarn Denier and ply number for 2 or more plys). The breaking strength is obtained by reading the maximum load on the S-S curve and dividing it by the nominal denier. The shape stability index can be obtained as the sum of the elongation at specific load at 2.25 g/d and the shrinkage rate (Testrite, 0.05 g/d, 177 degrees, 2 minutes), and is expressed by the E-S Index.

In the case of a conventional polyethylene terephthalate dip cord, it is possible to have the shrinkage range of the present invention, but in this case, as the shrinkage ratio is lowered, the elastic modulus is also lowered, and the strength becomes 3.0 g/d or less at 5%, so the performance improvement of the tire is not sufficient, and it is common to have a shape stability index of 6.0 or more and a breaking strength of 7.5 g/d or less.

Conversely, when the elastic modulus is increased to make the strength at 5% the level of the present invention, the shrinkage rate becomes more than 3.5%, so the processability becomes insufficient when forming a tire, and as a result, the uniformity is poor, resulting in a decrease in high-speed durability due to tire unevenness.

According to another suitable embodiment of the present invention, the dip cord is characterized in that it has an intermediate elongation of 2.1 to 4.0% at 2.25 g/d and an elongation at break of 8.0 to 16.0%.

According to another suitable embodiment of the present invention, the dip cord is characterized in that the twist coefficient represented by the number of twists (Twist/meter) multiplied by the square root of Nominal Denier is 9,000 to 18,000.

Polyethylene terephthalate dip cords prepared according to the method described above can be used for the production of cap ply layers. And the high performance radial tire manufactured according to the present invention includes such a cap ply layer.

Figure 3:
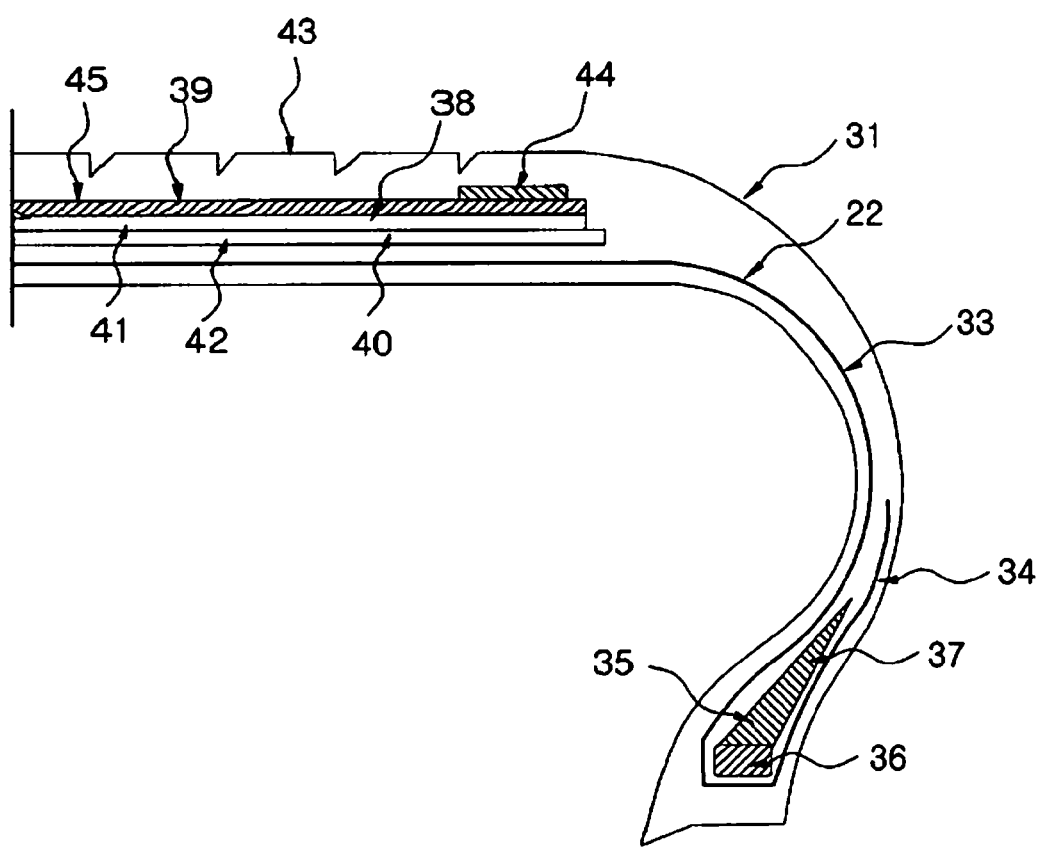
FIG. 3 shows the structure of a tire for a passenger car manufactured using a dip cord according to the present invention in a cap ply layer.

FIG. 3 is a partial cross-sectional view of the structure of a tire for a passenger car manufactured using a polyethylene terephthalate dip cord according to the present invention as a cap ply.

Referring to FIG. 3, the bead region 35 of the tire 31 becomes an annular bead core 36 that is non-stretchable. The bead core 36 is preferably made of a single filament steel wire wound continuously. In a preferred embodiment, a high strength steel wire having a diameter of 0.95 to 1.00 mm forms a 4×4 structure or a 4×5 structure. In an embodiment of the tire cord according to the present invention the bead region 35 may have a bead filler 37 and the bead filler 37 should have a hardness above a certain level and preferably a Shore A hardness 40 or more.

According to the present invention, the crown portion of the tire 31 can be reinforced by the belt structure 38 and the cap ply 39. The belt structure 38 includes a cut belt ply 40 consisting of two belt cords 41 and 42 and the belt cord 41 of the cut belt ply 40 may be oriented at an angle of about 20 degrees with respect to the circumferential center plane of the tire. One belt cord 41 of the belt ply 40 may be disposed opposite the direction of the belt cord 42 of the other belt ply 40 in a direction opposite the circumferential center plane. However, the belt structure 38 may include any number of plys, and may preferably be arranged in the range of 16 to 24°. The belt structure 38 serves to provide lateral stiffness to minimize the rise of the tread 43 from the road surface during operation of the tire 31. The belt cords 41 and 42 of the belt structure 38 may be made of steel cords and have a 2+2 structure, but may be made of any structure. The cap ply 39 and the edge ply 44 are reinforced at the top of the belt structure 38. The cords 45 of the cap ply 39 are reinforced in parallel with the circumferential direction of the tire so as to suppress the size change in the circumferential direction due to the high-speed rotation of the tire, and the cap ply cords 45 of the cap ply 39 having a large heat-shrinking stress at a high temperature are used. The cap ply cord 45 of the cap ply 39 can be manufactured using a dip cord made of a high strength yarn manufactured according to the method of the present invention. One layer of cap ply 39 and one layer of edge ply 44 may be used, and preferably one or two layers of cap ply and one or two layers of edge ply may be reinforced.

Reference numerals 32 and 34 of FIG. 3 denote a carcass layer 32 and a ply turn-up 34. And reference numeral 33 denotes a carcass layer reinforcing cord 33.

Examples and comparative examples which do not limit the scope of the present invention are described below. In the following Examples and Comparative Examples, physical property evaluation was measured or evaluated as follows.

(a) Shrinkage Rate

After leaving at it is at 25° C. and 65% RH for 24 hours, the shrinkage ratio was expressed by using the ratio of the length (L0) measured at a static load of 0.01 g/d and the length (L1) after treatment at a static load of 0.01 g/d at 177° C. for 2 minutes, using Testrite.

$$S(\%)=(L0-L1)/L0\times 100$$

(b) Dip Cord Strength (g/d) and Intermediate Elongation % at 2.25 g/d, Strength at 5%

It was measured at a sample length of 250 mm and a tensile speed of 300 m/min using an Instron low-speed stretch tensile tester. The intermediate elongation at 2.25 g/d refers to the elongation represented by a load of 2.25 g/d on the stress-deformation rate curve, and the strength at 5% is measured by measuring the load at 5% deformation rate in the stress-deformation rate curve and dividing it by the Total Denier of the cord.

(c) Dip Cord Shape Stability (E-S Index)

It means the sum of the intermediate elongation and shrinkage rate (Testrite, 0.05 g/d, 177 degrees, 2 minutes) at 2.25 g/d, which is the elongation under the constant load of the above (b).

Example 1

Polyethylene terephthalate fibers were obtained with raw cord according to the method described above in order to manufacture the tire reinforcing fibers.

To the polyethylene terephthalate yarn (1000 D), a lower edge of 270 TPM was added, and again, an upper edge of 270 TPM was added and twisted together to prepare a 2Ply raw cord. The obtained raw code was processed by a two-bath dipping method, and the one-bath dipping was performed by passing the raw cord through the adhesive solution prepared by the following method and drying at 160° C. for 150 seconds, followed by heat treatment at 240° C. for 60 seconds. A 3% stretch was applied during drying to prevent unevenness of the raw cord due to heat shrinkage.

A solution containing 950 parts by weight of distilled water; 5 parts by weight of 100% epoxy; 30% by weight of 50% isocyanate was prepared and stirred at 25° C. for 3 hours.

The two-bath dipping was performed by passing the raw cord through the adhesive solution prepared by the following method and drying at 160° C. for 90 seconds, followed by heat treatment at 240° C. for 60 seconds. When drying, −1% stretch was applied.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring, followed by adding the following elements:

300 parts by weight of 40 wt % VP-latex, 129 parts by weight of distilled water and 23.8 parts by weight of 28% ammonia water were added and aged at 25° C. for 20 hours to maintain a solid concentration of 19.05%.

The two-bath dipping heat treatment was performed to complete the adhesive treatment. The properties of the thus-prepared dip cords were evaluated and are shown in Table 1.

Example 2

A dip cord was prepared in the same manner as in the above example 1 except that 410 TPM ply twist was applied to polyethylene terephthalate yarn (1300 D), and 410 TPM cable twist was again applied thereto to prepare a raw cord by twisting them together, and twisting was used by 1 ply when preparing the raw cord. The properties of the thus-prepared dip cords were evaluated and are shown in Table 1.

Example 3

A dip cord was prepared in the same manner as in the above example 1 except that 235 TPM ply twist was applied to polyethylene terephthalate yarn (1300 D), and 235 TPM cable twist was again applied thereto to prepare a raw cord by twisting them together. The properties of the thus-prepared dip cords were evaluated and are shown in Table 1.

Comparative Example 1

460 TPM ply twist was applied to 66 yarns of nylon (840 D), and 460 TPM cable twist was again applied thereto to prepare a raw cord by twisting them together. In the production of the raw cord, it was twisted by 2 ply, and passed through the prepared adhesive solution to the prepared raw cord to impart an adhesive solution. A stretch was applied during drying to prevent unevenness of the raw cord due to heat shrinkage.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring, followed by adding the following elements:

300 parts by weight of 40 wt % VP-latex, 129 parts by weight of distilled water and 23.8 parts by weight of 28% ammonia water were added and aged at 25° C. for 20 hours to maintain a solid concentration of 19.05%.

An adhesive solution was applied to perform a one bath dipping heat treatment to complete the adhesive treatment. The properties of the thus-prepared dip cords were evaluated and are shown in Table 1.

Comparative Example 2

A dip cord was prepared in the same manner as in the above comparative example 1 except that 280 TPM ply twist was applied to nylon 66 (1260 D), and 280 TPM cable twist was again applied thereto to prepare a raw cord by twisting them together. The properties of the thus-prepared dip cords were evaluated and are shown in Table 1.

Comparative Example 3

A clip cord was prepared in the same manner as in the above example 1 except that 370 TPM ply twist was applied to polyethylene terephthalate yarn (1500 D), and 370 TPM cable twist was again applied thereto to prepare a raw cord by twisting them together. The properties of the thus-prepared dip cords were evaluated and are shown in Table 1.

44 at the top so that the cap ply cords in the cap ply 39 are parallel to the circumferential direction of the tire. The properties of the thus-prepared dip cords were evaluated and are shown in Table 2.

Example 5

A tire was prepared in the same manner as in Example 4, except that the dip cord prepared in Example 2 was used as a cord material for tire production. The properties of the thus-prepared dip cords were evaluated and are shown in Table 2.

Example 6

A lire was prepared in the same manner as in Example 4, except that the dip cord prepared in Example 3 was used as a cord material for tire production. The properties of the thus-prepared dip cords were evaluated and are shown in Table 2.

TABLE 1

|  |  | Example 1 | Example 2 | Example 3 | Comparative Example 1 | Comparative Example 2 | Comparative Example 3 |
|---|---|---|---|---|---|---|---|
| Material |  | PET | PET | PET | Nylon | Nylon | PET |
| Denier | d | 1000 | 1300 | 1300 | 840 | 1260 | 1500 |
| Ply | — | 2 | 1 | 2 | 2 | 2 | 2 |
| Force | kgf | 16.0 | 9.1 | 19.7 | 15.2 | 24.1 | 22.9 |
| Strength | g/d | 7.2 | 7.0 | 7.3 | 9.1 | 8.6 | 6.9 |
|  | g/d, @5% | 2.7 | 3.0 | 2.6 | 1.0 | 1.2 | 2.7 |
| elongation at specific load | %, @2.25 g/d | 3.3 | 3.1 | 3.4 | 7.9 | 7.9 | 4.2 |
| elongation at break | % | 13.4 | 11.3 | 13.9 | 20.1 | 23.1 | 17.0 |
| shrinkage rate | %, 0.01 g/d | 3.4 | 3.6 | 3.5 | 6.5 | 5.9 | 3.3 |
|  | %, 0.05 g/d | 2.5 | 2.7 | 2.6 | 5.6 | 5.0 | 2.3 |
| E-S Index | — | 5.8 | 5.8 | 6.0 | 13.5 | 12.9 | 6.6 |
| no. of twists | TPM | 270 | 410 | 235 | 460 | 280 | 370 |
| twist coefficient | — | 12075 | 14783 | 11983 | 18854 | 14056 | 20266 |

Example 4

A radial tire manufactured using the dip cord manufactured by Example 1 of the present invention as a cap ply has a carcass layer having a radially outer side ply turn-up, and the carcass layer is provided so as to include one layer. At this time, the carcass cord was oriented at a 90 degree angle with respect to the circumferential middle surface of the tire. The ply turn-up 34 has a height of 40 to 80% with respect to the maximum cross-sectional height of the tire. The head region 35 has a head core 36 having 4×4 high strength steel wires having a diameter of 0.95 to 1.00 mm and a bead filler 37 having a shore A hardness of 40 or more. The belt structure 38 is reinforced by a belt reinforcing layer consisting of one layer of cap ply 39 and one layer of edge ply

TABLE 2

| Division |  | Example 4 |
|---|---|---|
| carcass | Material | PET |
|  | Spec. (d/twisted yarn) | 1500 d/2 |
|  | Force (kg) | 24 |
|  | Elastic modulus (g/d) | 72 |

TABLE 2-continued

| Division |  | Example 4 |
|---|---|---|
| cap ply | Material | Dip code of Example 1 |
|  | Spec. (d/twisted yarn) | 1000 d/2 |
|  | Force (kg) | 16.0 |
|  | strength (g/d, @5%) | 2.7 |
| tire | Flatness ratio | 0.6 |
|  | No. of carcass layers | 1 |
|  | No. of cap ply layers | 1 |

Comparative Example 4

A tire was prepared in the same manner as in Example 4, except that the dip cord prepared in Comparative Example 1 was used as a cord material for tire production. The properties of the thus-prepared dip cords were evaluated and are shown in Table 3.

Comparative Example 5

A tire was prepared in the same manner as in Example 4, except that the dip cord prepared in Comparative Example 2 was used as a cord material for tire production. The properties of the thus-prepared dip cords were evaluated and are shown in Table 3.

Comparative Example 6

A tire was prepared in the same manner as in Example 4, except that the dip cord prepared in Comparative Example 3 was used as a cord material for tire production. The properties of the thus-prepared dip cords were evaluated and are shown in Table 3.

TABLE 3

| | Division | Comparative Example 4 | Comparative Example 5 | Comparative Example 6 |
|---|---|---|---|---|
| carcass | Material | PET | PET | PET |
| | Spec. (d/twisted yarn) | 1500 d/2 | 1500 d/2 | 1500 d/2 |
| | Force (kg) | 24 | 24 | 24 |
| | Elastic modulus (g/d) | 72 | 72 | 72 |
| cap ply | Material | Dip code of Comparative Example 1 | Dip code of Comparative Example 2 | Dip code of Comparative Example 3 |
| | Spec. (d/twisted yarn) | 840 d/2 | 1260 d/2 | 1500 d/2 |
| | Force (kg) | 15.2 | 24.1 | 22.9 |
| | Strength (g/d, @5%) | 1.0 | 1.2 | 2.7 |
| tire | Flatness ratio | 0.6 | 0.6 | 0.6 |
| | No. of carcass layers | 1 | 1 | 1 |
| | No. of cap ply layers | 1 | 1 | 1 |

The 205/65 R15 V tire manufactured according to Examples 5 and 6 and Comparative Example 3 was mounted on a 2000 cc class passenger car, and the noise generated in the vehicle while driving at 60 km/h was measured and the values in the audible frequency range were expressed in dB. Further, the steering stability and riding comfortability were evaluated in 5-point units among 100 points by the test-course driving of a skilled driver, and the results are shown in Table 4 below. The durability was measured according to the P-metric tire endurance test method of FMVSS 109 at a temperature of 38(±3° C.), the tire load of 85, 90 and 100%, and a vehicle was driven for a total of 34 hours at the speed of 80 km/h. And it was judged as OK when no traces such as head separation, cord cutting, belt separation, etc. were found in any part such as a tread, a sidewall, a carcass cord, an inner liner and a bead.

TABLE 4

| Division | Example 4 | Example 5 | Example 6 | Comparative Example 4 | Comparative Example 5 | Comparative Example 6 |
|---|---|---|---|---|---|---|
| Tire weight (kg) | 9.8 | 9.9 | 9.8 | 9.7 | 9.8 | 9.9 |
| riding comfortability | 100 | 99 | 100 | 97 | 98 | 95 |
| steering stability | 100 | 100 | 100 | 100 | 100 | 98 |
| durability | OK | OK | OK | OK | OK | OK |
| Uniformity | 100 | 100 | 100 | 98 | 98 | 99 |
| Noise (dB) | 61.2 | 61.4 | 61.0 | 61.7 | 61.5 | 62.3 |

Based on the test results of Table 4, the tires using the deep cord according to the present invention (Examples 4, 5, and 6) were superior in effects of noise reduction and steering stability compared to Comparative Examples 4 and 5 using the conventional nylon 66 yarn in the cap ply, and the uniformity of the tire was also improved.

In the above, the present invention has been described in detail only with respect to the described embodiments, but it is apparent to those skilled in the art that various modifications and variations are possible within the technical scope of the present invention, and it is natural that such modifications belong to the scope of the appended claims.

| [Description of reference numerals] | |
|---|---|
| 1: extruder | 2: gear pump |
| 3: nozzle | 4: heating device |
| 5: cooling zone | 6 to 10: drawing roller |
| 11: winding roller | 12: emulsion supply device |
| 31: tire | 32: carcass layer |
| 33: carcass layer reinforcing cord | 34: ply turn-up |
| 35: bead region | 36: bead core |
| 37: bead filler | 38: belt structure |
| 39: cap ply | 40: belt ply |
| 41, 42: belt cord | 43: tread |
| 44: edge ply | 45: cap ply cord |

The invention claimed is:
1. A radial tire comprising:
a pair of parallel bead cores;
at least one radial carcass ply which is wound around the bead core;
at least one inclined belt layer laminated on an outer circumference of the at least one radial carcass ply; and
at least one cap ply layer laminated on an outer circumference of the inclined belt layer in a tire circumferential direction,
wherein the cap ply includes a dip cord manufactured using a yarn containing 90 mol % or more of polyethylene terephthalate, wherein the dip cord has a shrinkage rate of 3.0 to 4.0%, a load of 2.5 to 3.0 g/d at 5% elongation, a breaking strength of 6.5 to 7.5 g/d, and a shape stability index of 5.8 to 6.5, wherein the dip cord is generated by twisting 400 to 2200 d yarns containing 90 mol % or more of polyethylene terephthalate by 1 or more plys, and wherein the dip cord's nominal denier is 1,300 to 2,600, and the dip cord's twist coefficient, which is a number of twists multiplied by a square root of nominal denier, is 9,000 to 18,000.

2. The radial tire of claim 1, wherein the dip code has an intermediate elongation of 2.1 to 4.0% at 2.25 g/d and an elongation at break of 8.0 to 16.0%.

3. The radial tire of claim 1, wherein the cap ply layer is reinforced with one or two layers.

\* \* \* \* \*